March 29, 1938. H. JÄNICKE 2,112,368
FREE PISTON ENGINE OF THE OPPOSED TYPE
Filed Jan. 21, 1937
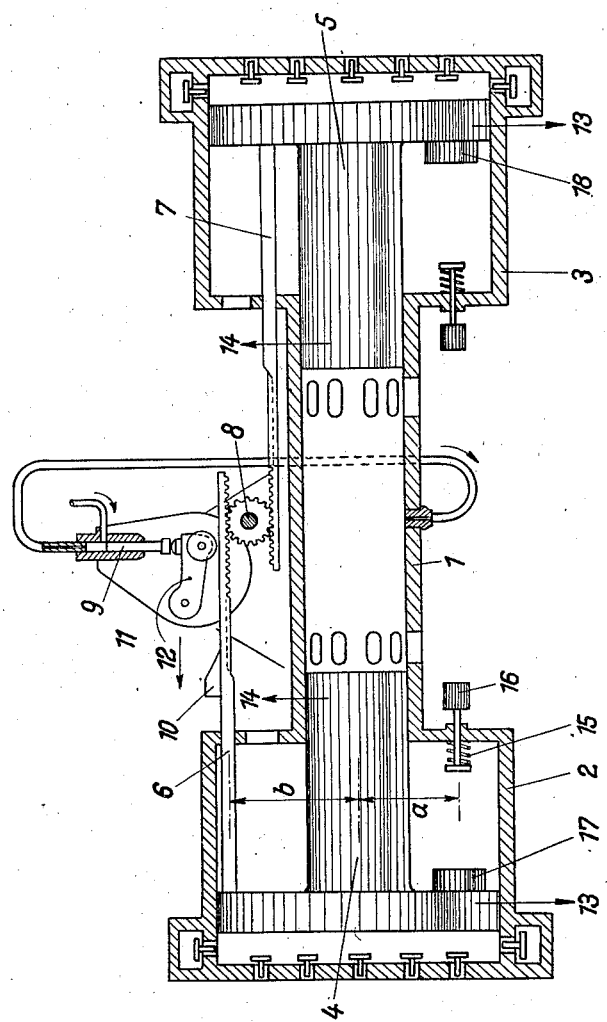
Inventor:
Hermann Jänicke
by Michaelis & Michaelis,
Attys Patented Mar. 29, 1938

2,112,368

UNITED STATES PATENT OFFICE 2,112,368

FREE PISTON ENGINE OF THE OPPOSED TYPE

Hermann Jänicke, Lochham, near Munich, Germany, assignor to Therese Junkers, née Bennhold, Gauting, near Munich, Germany Application January 21, 1937, Serial No. 121,632
In Germany January 21, 1936

5 Claims. (Cl. 123—46)

My invention relates to free piston engines and more especially to engines of this kind belonging to the opposed piston type, in which the opposed pistons are coupled for synchronization by means of a system of levers, pairs of racks and gear wheels or the like.

If in engines of this type such coupling members are provided only on one side of the longitudinal axis of the engine, mass forces originated by the masses of the coupling members act onto the free pistons. These mass forces are further increased in the case where extraneous forces originating from the performance of work come into play with the gear members, such work including, for example, the drive of a fuel pump or other auxiliary devices. These mass forces will exert tilting moments on the pistons, which are then subjected to considerable sliding pressures in their cylinders.

My invention has for one of its objects to avoid this drawback by providing means whereby moments of substantially equal magnitude are created which however act in opposite directions and thus counteract these tilting moments.

I arrange the means for creating such counter-moments in the longitudinal plane extending through the coupling members, and if the forces to be counterbalanced and the forces counterbalancing same are equally spaced from the middle axis of the pistons, the forces should be equal. On the other hand the forces may also be spaced differently from the middle axis, however in that case the ratio of these forces must be the reverse of the ratio of their distances from the middle axis.

Special means, such as for instance additional masses moving only during part of the piston stroke may be provided for adapting the characteristic of the additional forces to the temporal action of the forces to be balanced, so that these additional forces are rendered active temporarily by the pistons.

Acceleration or retardation of the masses of the coupling gear members further gives rise to the generation of forces, the magnitude and direction of which varies greatly, during a piston stroke, from zero to a maximum and down to zero. Obviously the moments hereby created must also be balanced by counter-moments having the same characteristic.

According to this invention I therefore provide additional masses rigidly connected with the pistons, which are subjected to the same accelerations and retardations as the masses of the coupling members. Similarly the forces resulting from the acceleration and retardation of oscillating or rotating masses may be balanced, as far as the momentum exerted by them on the free pistons is concerned, by counteracting forces of corresponding reciprocatory additional masses. All these additional masses must also be arranged in the same longitudinal plane as the masses of the coupling gears, however, on the opposite side of the pistons.

In the drawing affixed to this specification and forming part thereof, a free piston motor compressor embodying my invention is illustrated diagrammatically by way of example in axial section.

In the drawing 1 is the motor cylinder, 2, 3 are the compressor cylinders, 4, 5 are the opposed free pistons, 6, 7 are the racks positively coupling the two pistons and 8 is a gear wheel mounted on the motor casing and coupling the two racks.

The rack 6 is formed with a cam 10 for the automatic operation of the fuel pump 9, a lever 11 inserted between the rack 6 and the pump 9 being lifted by the cam 10, which is so arranged that the fuel pump is operated near the end of the inward stroke of the pistons 4, 5 and shortly before the direction of movement of the pistons is reversed. The resistance force acting on the cam 10 in the direction of arrow 12 creates a tilting moment action on the pistons 4, 5, which tends to turn the pistons in the direction of the arrows 13, 14. I counterbalance this moment by means of the springs 15 provided at the bottom of the cylinders 2, 3 in the way of the pistons, these springs, during that part of the stroke, during which a force is acting on the cam 10, counterbalancing this force. Obviously the force acting on the cam 10 and the force created by the springs 15 must be inversely proportional to their distances from the middle axis of the pistons.

Special provision may be made for adapting the characteristic of the additional forces to the timely progress of the forces to be counterbalanced. In the example here illustrated, when the roll of the fuel pump lever climbs up the cam face 10, the force acting in the direction of arrow 12 will rise at first and, after the pump piston has come to the end of its stroke, will drop again during the last part of the movement of the pistons 4, 5. In comparison therewith the timely progress of the counteracting force of spring 15 deviates appreciably in that the force exerted by the spring rises permanently, so that near the end of the movement the spring force will exert an unbalanced tilting moment on the pistons. If now for instance an additional mass 16, which moves only during part of the free piston stroke, is connected with spring 15, the free pistons must first furnish an additional force for the acceleration of this additional mass 16, which must be added to the increasing force of the spring. This additional accelerating force however decreases quickly as soon as the mass 16 has approximately attained the velocity at which the free pistons move. If, in the last part of the stroke, the free pistons are retarded to a higher extent than the mass 16, no further additional force need be exerted by the free pistons and even the force required for overcoming the rising force of the spring can be reduced, since the moving mass 16, once being set moving, will place the spring under further tension. Thus the timely progress of the working force in the direction of arrow 12 and of the additional balancing force acting on the piston 4 are kept approximately equal.

Apart therefrom the mass forces arising from the acceleration or retardation of the rods 6 and 7 and acting in the longitudinal direction of these rods, also exert tilting moments on the pistons 4, 5, whereby these pistons are turned in the directions of the arrows 13, 14, being thus exposed in these places to high loads acting on the sleeves (cylinders) and to correspondingly high wear. In order to balance these tilting moments, I arrange on the pistons additional masses 17, 18 in the same longitudinal plane as the rods or racks 6, 7, but on the opposite side of the pistons. These additional masses follow the same rules of acceleration as the rods 6, 7, so that in any position of the pistons and at any moment these additional masses 17, 18 create countermoments for the balancing of the tilting moments of the mass forces generated by the members of the coupling gear. If the additional masses are spaced equally from the middle axis of the pistons as the rods 6, 7, the additional masses must also be equal to the masses of the rods. If however the distance $a$ between the additional mass 17 and the middle axis should be smaller than the distance $b$ of the rod 6 from the same axis, the magnitudes of the two masses would have to be inversely proportional to their distances from the middle axis.

The force created by the rotary movement of the gear wheel 8 may also be balanced by the provision of a corresponding additional mass on the opposite side of the pistons.

I wish it to be understood that I do not desire to be limited to the exact details of construction shown and described, for obvious modifications will occur to a person skilled in the art.

I claim:—

1. A free piston engine of the opposed piston type, comprising two pistons arranged for reciprocation in opposite directions, a coupling gearing arranged on one side of the middle axis of said pistons, and springs for creating a moment approximately equal and opposed to the tilting moment exerted by said coupling gearing on said pistons.

2. A free piston engine of the opposed piston type, comprising two pistons arranged for reciprocation in opposite directions, a coupling gearing arranged on one side of the middle axis of said pistons, means for creating a moment approximately equal and opposed to the tilting moment exerted by said coupling gearing on said pistons, and additional masses arranged to be set moving by said pistons only during part of the piston stroke.

3. A free piston engine of the opposed piston type, comprising two pistons arranged for reciprocation in opposite directions, a coupling gearing arranged on one side of the middle axis of said pistons, springs for creating a moment approximately equal and opposed to the tilting moment exerted by said coupling gearing on said pistons, and additional masses connected with said springs and arranged to be set moving by said pistons only during part of the piston stroke.

4. A free piston engine of the opposed piston type, comprising two pistons arranged for reciprocation in opposite directions, a coupling gearing arranged on one side of the middle axis of said pistons, and additional masses rigidly connected with said pistons, said additional masses being located in positions opposed to that of said coupling gearing and adapted to create countermoments approximately equalling and capable of counteracting the tilting moments exerted by said gearing on said pistons.

5. A free piston engine of the opposed piston type, comprising two pistons arranged for reciprocation in opposite directions, a coupling gearing arranged on one side of the middle axis of said pistons, and additional masses rigidly connected with said pistons, said additional masses being located in positions opposed to that of said coupling gearing, and adapted to create countermoments approximately equalling and capable of counteracting the tilting moments exerted by the rotary parts of said gearing on said pistons.

HERMANN JÄNICKE.